United States Patent
Rajasekaran

(10) Patent No.: US 11,281,424 B2
(45) Date of Patent: Mar. 22, 2022

(54) CONTROL POD FOR A WIRELESS HEADSET

(71) Applicant: Plantronics, Inc., Santa Cruz, CA (US)

(72) Inventor: Arun Rajasekaran, Saratoga, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/987,222

(22) Filed: Aug. 6, 2020

(65) Prior Publication Data

US 2022/0043624 A1  Feb. 10, 2022

(51) Int. Cl.
| | | |
|---|---|---|
| *H04R 1/10* | (2006.01) | |
| *G06F 3/16* | (2006.01) | |
| *H04R 1/08* | (2006.01) | |
| *H04M 1/60* | (2006.01) | |
| *H04M 1/72412* | (2021.01) | |
| *G06F 3/14* | (2006.01) | |

(52) U.S. Cl.
CPC .............. *G06F 3/165* (2013.01); *G06F 3/167* (2013.01); *H04M 1/6066* (2013.01); *H04M 1/72412* (2021.01); *H04R 1/08* (2013.01); *H04R 1/1016* (2013.01); *H04R 1/1025* (2013.01); *H04R 1/1041* (2013.01); *G06F 3/14* (2013.01); *H04R 2420/07* (2013.01)

(58) Field of Classification Search
CPC .... G06F 3/165; G06F 3/167; H04M 1/72412; H04M 1/6066; H04R 1/08
See application file for complete search history.

(56) References Cited

U.S. PATENT DOCUMENTS

| | | | |
|---|---|---|---|
| 7,715,191 | B2 | 5/2010 | Leung |
| 8,948,412 | B2 | 2/2015 | Lee et al. |
| 9,148,717 | B2 | 9/2015 | Shaffer |
| 9,210,498 | B1 * | 12/2015 | Shaffer ................... H02J 7/342 |
| 9,769,558 | B2 | 9/2017 | Chandramohan et al. |
| 10,237,642 | B2 | 3/2019 | Cheney |
| 2017/0093079 | A1 * | 3/2017 | Wagman ................. H04R 1/02 |
| 2017/0289668 | A1 * | 10/2017 | Kim ...................... H04R 1/1041 |
| 2018/0091884 | A1 * | 3/2018 | Minoo ................. H04R 1/1091 |
| 2018/0367883 | A1 | 12/2018 | Minoo et al. |
| 2020/0336820 | A1 * | 10/2020 | Tasaka ..................... H04N 5/38 |
| 2021/0037306 | A1 * | 2/2021 | Lehnert ..................... H04R 5/04 |

* cited by examiner

*Primary Examiner* — Simon King
(74) *Attorney, Agent, or Firm* — Ramey LLP; Jacob B. Henry

(57) ABSTRACT

A headset control pod stores a headset for charging when not in use. When the headset is in signal communication with a smart device, a user can use the control pod to mute and unmute a call of the smart device with no need to access the smart device. When the headset is used for music playback from the smart device, the control pod can be used to pause or advance playback. The control pod can also control playback by a headset of music stored in the control pod.

18 Claims, 6 Drawing Sheets

CONTROL POD FOR A WIRELESS HEADSET

BACKGROUND

Mobile phones and small watch-like wearable devices exist which can connect wirelessly to Bluetooth headsets. However, line-of-sight devices like mobile phones and other smart wearable devices are usually bulky and not ideal for controlling wireless headsets. Thus, there is room for improvement in the art.

SUMMARY

In accordance with an example of this disclosure, a headset control pod includes: a housing; a power source; a first radio; a user interface; a wireless headset-receiving area comprising a pin; a memory; and a processor coupled to the power source, the first radio, the user interface, the pin, and the memory, wherein the processor is operable to: communicate with a wireless headset over a first channel using the first radio; transmit a first data stream over the first channel containing first audio data for broadcast by a speaker of the wireless headset, the first audio data based on data (e.g., music) stored by the memory; detect a first input at the user interface; pause transmission of the first data stream, responsive to detecting the first input; detect a coupling of the wireless headset to the power source through the pin; and terminate the first channel responsive to the coupling, wherein the housing is operable to releasably retain the wireless headset in the wireless headset-receiving area for charging by the power source through the pin.

Another example of this disclosure is a method of operating a headset control pod, comprising: retrieving, using a processor, first audio data from a memory; establishing a first channel between the processor and a wireless headset, using a first radio of a control pod; transmitting a first data stream over the first channel containing second audio data for broadcast by a speaker of the wireless headset, the second audio data based on first audio data; detecting a first input using a user interface of the control pod; pausing transmission of the first data stream, responsive to detecting the first input; releasably connecting the wireless headset to the control pod at a wireless headset-receiving area, the wireless headset-receiving area including a pin; coupling a power source of the control pod to a battery cell of the wireless headset using the pin; terminating the first channel responsive to the coupling; and charging the battery cell of the wireless headset using the power source.

Yet another example of this disclosure is a method of operating a headset control pod which includes: detecting a decoupling of the wireless headset from the power source of the control pod at the pin; detecting a coupling of the wireless headset with a smart device; detecting a second input at the user interface of the control pod; and initiating, using the first radio, a second channel between the wireless headset and the smart device, responsive to detecting the second input at the user interface.

Still another example of this disclosure is a method of operating a headset control pod which includes: controlling one or more telephonic operations of a smart device interacting with a headset by transmitting control instructions to a second radio of the smart device, responsive to detecting one or more third inputs at the user interface.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown.

DETAILED DESCRIPTION

Figure 1:
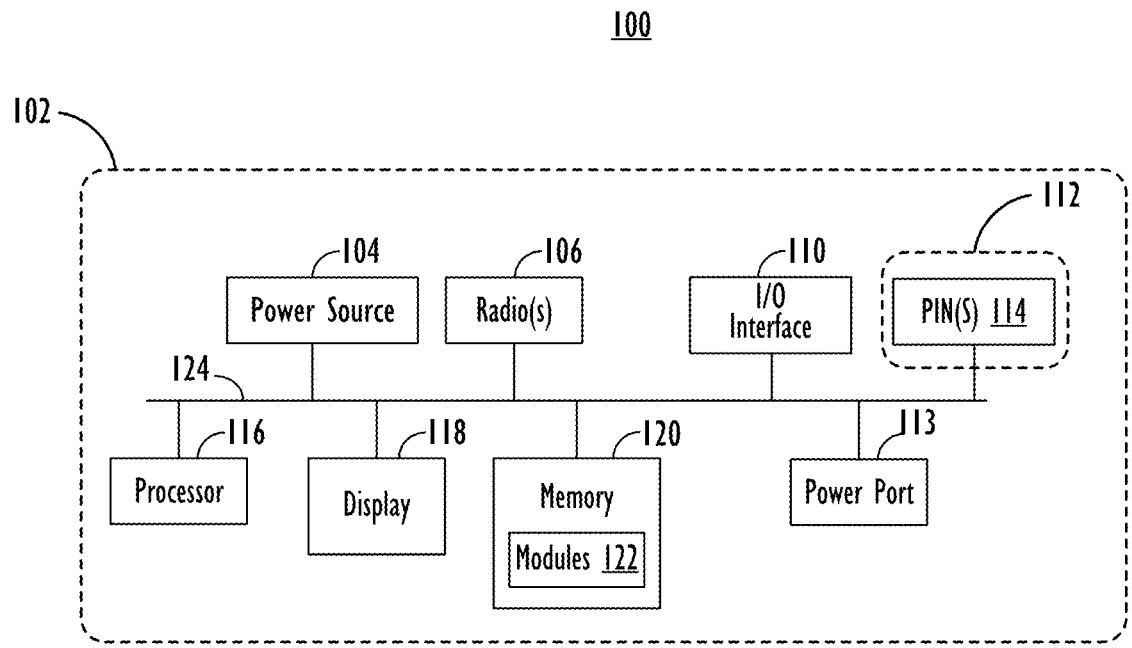
FIG. 1 is a block diagram of a headset control pod, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

FIG. 1 is a block diagram of a headset control pod, in accordance with an example of this disclosure. Components of the control pod 100 are housed within a housing 102. The control pod 100 includes a power source 104 (e.g., a battery of rechargeable cells), and a radio 106 which can be used to communicate with one or more other electronic devices (such as a headset, a smart phone, and a computer). The control pod 100 includes a user interface 110, which can include such items as one or more actuable buttons and a touchscreen. The housing 102 includes a headset-receiving area 112 comprising at least one pin 114, which can be used to connect one or more batteries of a headset to the power source 104 for recharging. The control pod 100 includes a power port 113 which can be used to couple the internal power source 104 to an external power source (e.g., mains power) to recharge the internal power source 104. The control pod 100 also includes a processor 116 which is coupled to the power source 104, the radio(s) 106, and the user interface 110 through a bus 124. The control pod 100 also includes a memory 120 which can store various modules 122 which are executable by the processor 116 to control the functions of the remaining components and their interactions with each other, as would be understood by a person of skill. Memory 120 can also store audio data such as music and audio books. The housing 102 can store a headset (206) when not in use. The control pod 100 can charge batteries of a headset (206) during storage.

Figure 2A:
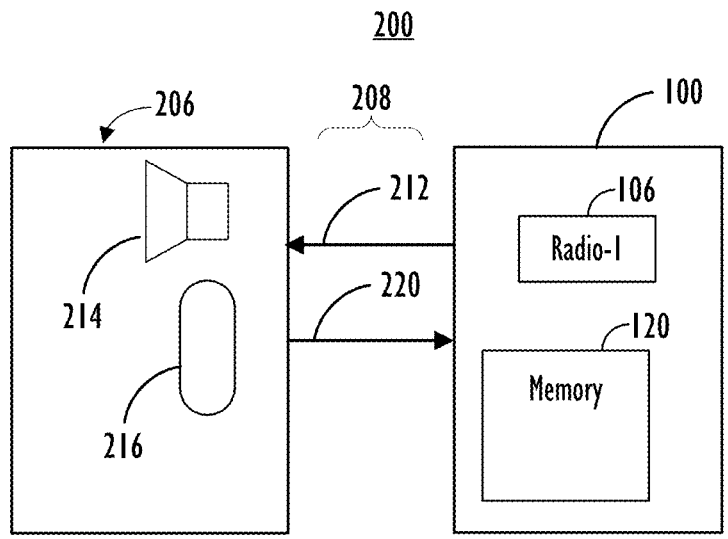
FIG. 2A is a block diagram of an operational environment of a control pod, in accordance with an example of this disclosure.

FIG. 2A is a block diagram of an operational environment 200 of a control pod 100, in accordance with an example of this disclosure. The control pod 100 is in signal communication with a headset 206 over a channel 208. The headset 206 has been removed from the housing 102 of the control pod 100. The headset 206 can include one or more speakers 214 and one or more microphones 216. In at least one example of this disclosure, the speaker(s) 214 and microphone(s) 216 each comprise their own radio (not shown).

In the example of FIG. 2A, a radio 106 of the control pod is transmitting a data stream 212 over channel 208. The data stream 212 can contain audio data retrieved from memory 120. The data stream 212 can contain audio data for broadcast by speaker 214 of the headset 206. Transmission of the data stream 212 by the control pod 100 can be paused or stopped when a user inputs an input at the user interface 110 (see FIG. 1), such as by pressing a button or touch pad. In at least one example of this disclosure, the processor 116 can detect when the headset 206 is coupled to the power source 104 through the pin 114 and can terminate the channel 208 in response to such detection.

In some examples of this disclosure, the control pod 100 can also receive second audio data 220 over the channel 208, such as audio data 220 captured using the microphone 216 of the headset 206. In some examples, the control pod 100 can store such audio in memory 120 for subsequent playback. In some examples of this disclosure, the control pod 100 can control audio pick-up by the microphone(s) 216 and/or audio broadcasting by the speaker(s) 214 based on user inputs received at the user interfaces 110 and/or based on (user) voice commands detected using the microphone(s) 216 of the headset 206.

In some examples of this disclosure, the processor 116 is operable to render information using the display 118, such as the charging status of a battery cell of the wireless headset 206, or information about music being played by the headset 206.

In at least one example, the control pod 100 can receive second audio data 220 over the first channel 208, such as audio data 220 captured using a microphone 216 of the wireless headset 206, and pause transmission of the first data stream 212, responsive to receiving the second audio data 220. Furthermore, the processor 116 can be operable to detect a second input at the user interface 110 and thereafter reinitiate transmission over the first channel 208 responsive to detecting the second input.

Figure 2B:
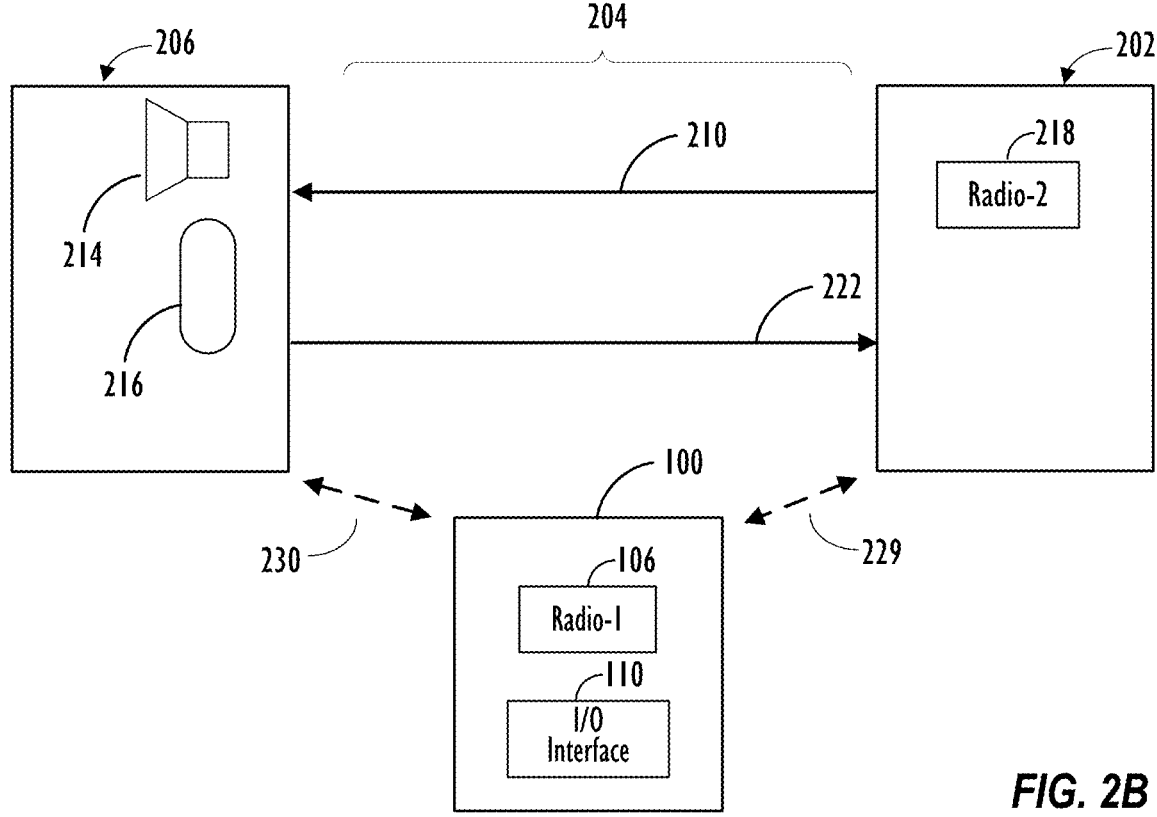
FIG. 2B is another block diagram of an operational environment of a control pod, in accordance with an example of this disclosure.

FIG. 2B is a block diagram of an operational environment 201 of a control pod 100, in accordance with an example of this disclosure. The control pod 100 is in signal communication with a smart device 202 (e.g., a smart phone), and in signal communication 230 with a headset 206. In the example of FIG. 2B, the radio 106 of the control pod 100 detects that a channel 204 has been established between the headset 206 and the smart device 202. The headset 206 is receiving a first data stream 210 from a radio 218 of the smart device 202 over the channel 204 and transmitting a second data stream 222 over the channel 204. The first data stream 210 can contain audio data, call information, and other information from the smart device 202. The first data stream 210 can contain audio data for broadcast by speaker 214 of the headset 206. For example, music stored by the smart device 202 can be transmitted to the speaker(s) 214 over the channel 204. In some examples, transmission of such audio data (e.g., music) by smart device 202 can be paused or stopped when a user inputs an input at the user interface 110 of the control pod 100. In at least one example of this disclosure, the processor 116 of the control pod 100 can detect when the headset 206 is coupled to the power source 104 through the pin 114 and will terminate the channel 204 in response.

In accordance with at least one example of this disclosure, the wireless headset control pod 100 is operable to: detect a decoupling of the wireless headset 206 from the power source 104 at the pin 114; detect a coupling of the wireless headset 206 with a smart device 202; detect a second input at the user interface 110; and initiate the channel 204 between the wireless headset 206 and the smart device 202, in response to detecting the user input at the user interface 110.

In those examples in which the housing houses a display (coupled to the processor 116), the control pod 100 can render information using the display 118 corresponding to audio data of the channel 204, such as information about music being (e.g., FIG. 4) played or the identity of a caller to the smart device 202.

In some examples, the processor 116 is operable to cause the radio 218 of the smart device 202 to end transmission of the audio data 210 to the wireless headset 206, in response to detecting a user input at the user interface 110, (e.g., a user presses a stop button.) In some examples, operations of the control pod 100 can also be controlled through voice commands, such as those captured by a microphone 216 of the headset 206.

In at least one example, the processor 116 is also operable to initiate audio pickup by a microphone 216 of the wireless headset 206 for transmission to the smart device 202 over channel 204, in response to a user input at the user interface 110 or detection of a voice command captured using the microphone 216 of the headset 206.

Figure 2C:
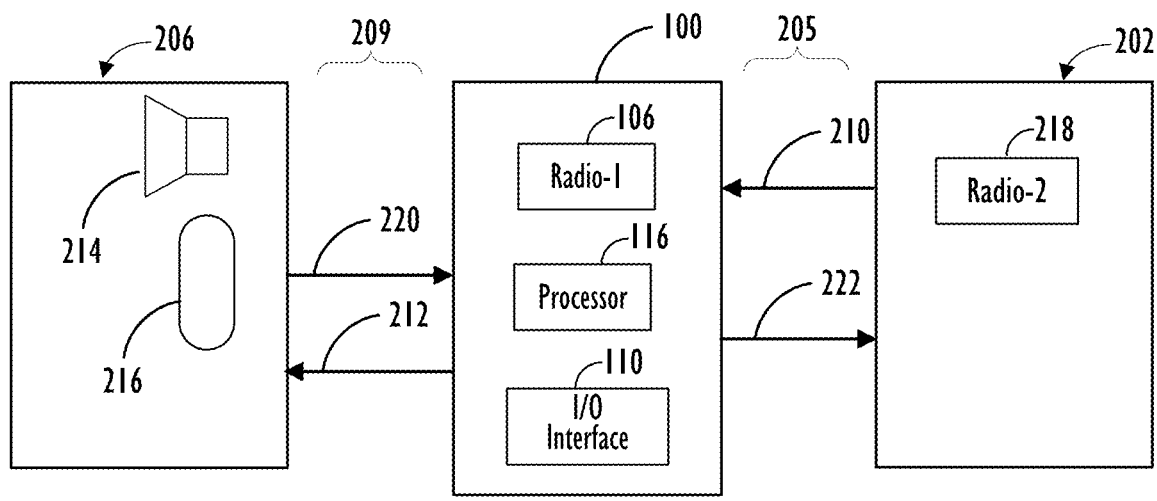
FIG. 2C is a third block diagram of an operational environment of a control pod, in accordance with an example of this disclosure.

FIG. 2C is a block diagram of an operational environment 200 of a control pod 100, in accordance with an example of this disclosure. The control pod 100 is in signal communication with a smart device 202 (e.g., a smart phone) over a first channel 205, and in signal communication with a headset 206 over a second channel 209. The headset 206 can include one or more speakers 214 and one or more microphones 216. In at least one example of this disclosure, the speaker(s) 214 and microphone(s) 216 each comprise their own radio (not shown).

In the example of FIG. 2C, a radio 106 of the control pod 100 is receiving a first data stream 210 from a radio 218 of the smart device over the first channel 205, and transmitting a second data stream 212 over the second channel 209. The first data stream 210 can contain audio data, call information, and other information from the smart device 202. The second data stream 212 can contain audio data for broadcast by speaker 214. The audio data broadcast by the speaker 214 can correspond to audio data of the first data stream 210. For example, music stored by the smart device 202 can be relayed to the speakers 214 by the control pod 100. In at least one example, relaying of such audio data (e.g., music) by the control pod 100 can be paused or stopped when a user inputs an input at the user interface 110. In at least one example of this disclosure, the processor 116 can detect when the headset 206 is coupled to the power source 104 through the pin 114 and can terminate the first channel 205 and/or the second channel 209 in response.

In some examples of this disclosure, the control pod 100 can also receive second audio data 220 over the second channel 209, such as audio data 220 captured using the microphone 216 of the headset 206. The control pod can (using radio 106) transmit third audio data 222 over the first channel 205 for transmission by a third radio 218 of the smart device 202. The audio data 222 sent to the smart device 202 can be based on the second audio data 220 from the headset 206. In some examples of this disclosure, when the smart device 202 is cell phone or a computer, the control pod can control whether an incoming call to the smart device 202 is accepted by the smart device. In some examples of this disclosure, the control pod 100 can control audio pick-up by the microphone(s) 216 and/or audio broadcasting by the speaker(s).

In accordance with the some examples, the processor 116 is operable to: detect a third input at the user interface 110; pause transmission over the first channel 205 responsive to detecting the third input; and pause transmission over the second channel 209 in response to detecting the third input. In at least one example, the processor 116 is also able to detect a decoupling of the headset 206 from the power source 104 at the pin 114; initiate a third channel with the smart device 202 responsive to the decoupling; and initiate a fourth channel with the headset 206 responsive to the decoupling. In at least one example of this disclosure, the control pod 100 can be used to control noise cancelling capabilities of the of the speaker(s) of the headset 206.

Figure 3:
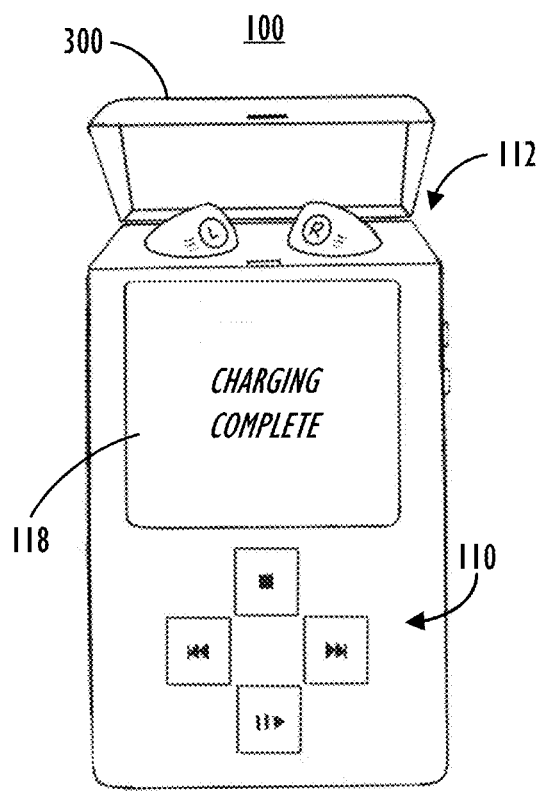
FIG. 3 illustrates a headset control pod, in accordance with an example of this disclosure.

FIG. 3 illustrates a headset control pod 100, in accordance with an example of this disclosure. The control pod 100 is in an open configuration, in which a lid 300 of the housing 102 is raised to reveal the receiving area 112 for earbuds of a headset (206). The user interface 110 contains several user-actuable buttons. The display screen 118 displays information concerning the charge status of the batteries of the headset 206.

Figure 4:
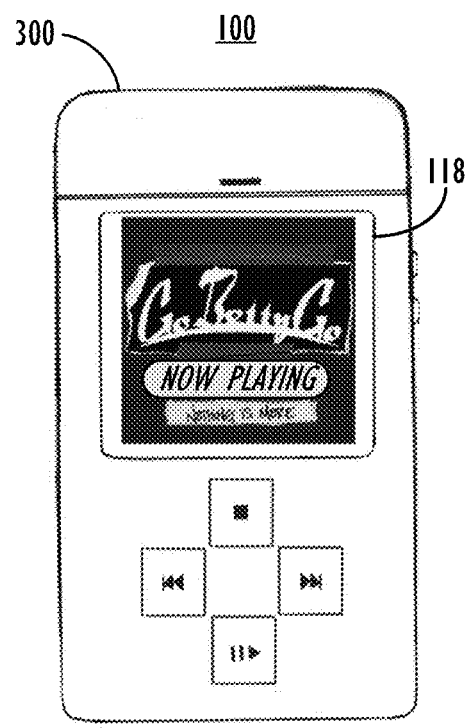
FIGS. 4-6 illustrate additional examples of the headset control pod.

FIG. 4 illustrates a headset control pod 100, in accordance with another example of this disclosure. In FIG. 4, the receiving area 112 of FIG. 3 is hidden by the closed lid 300. The display screen 118 displays information concerning the playback of music from a smart device (202) being played by a headset (206).

Figure 5:
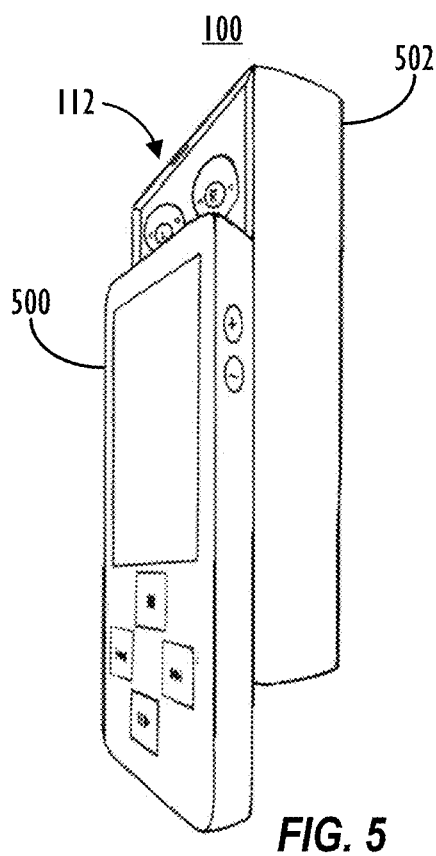

FIG. 5 illustrates a headset control pod 100, in accordance with another example of this disclosure. In FIG. 5, the headset receiving area 112 is exposed by sliding an upper portion 500 of the control pod 100 away from a lower portion 502.

Figure 6:
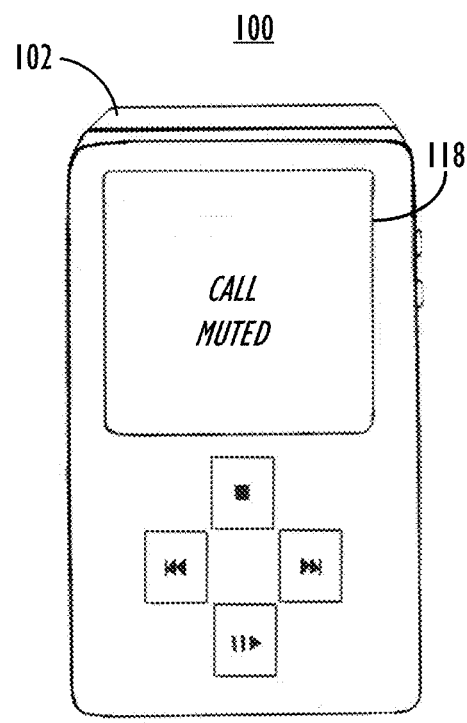

FIG. 6 illustrates a headset control pod 100, in accordance with another example of this disclosure. In FIG. 6, the headset receiving area 112 of FIG. 5 is not visible because the housing 102 is closed.

In each of FIGS. 4-6, the housing 102 is operable to releasably retain the headset 206 in the headset-receiving area 112 for charging by the power source 104 (e.g., a battery of rechargeable cells).

Figure 7:
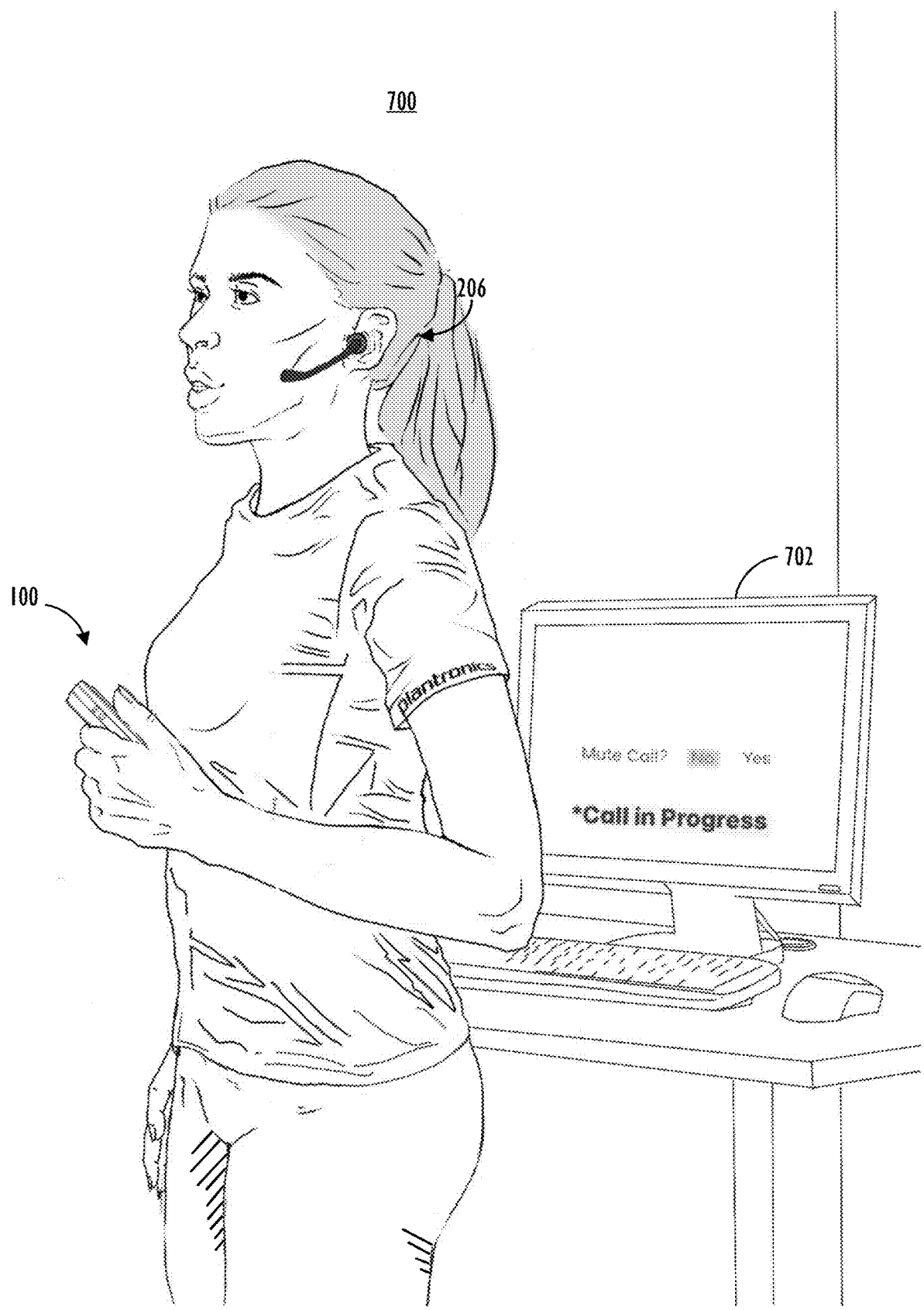
FIG. 7. illustrates an operational environment of a control pod, in accordance with an example of this disclosure.

FIG. 7. illustrates an operational environment 700 of a control pod 100, in accordance with an example of this disclosure. In FIG. 7, a user is on a call received through her computer 702. She can mute and unmute the call by simply pressing a button on her control pad 100. She does not have to maintain eye contact with her computer to know if she is muted, nor does have to search for call controls using a mouse or keyboard.

Figure 8:
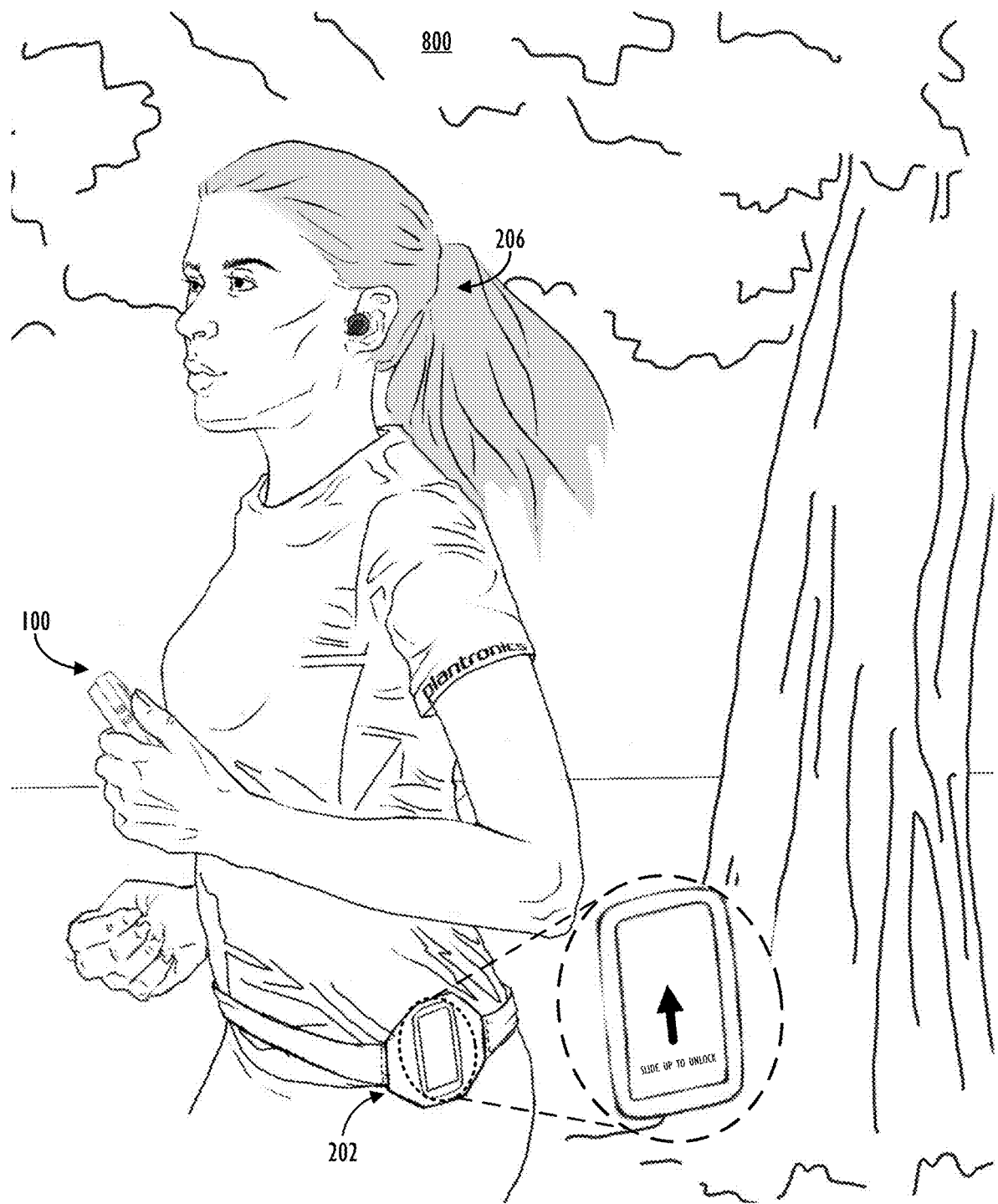
FIG. 8. illustrates another operational environment of the control pod, in accordance with an example of this disclosure.

FIG. 8. illustrates another operational environment 800 of a control pod 100, in accordance with an example of this disclosure. In FIG. 8, the user is able to control playback to her headset 206 from her smart device 202 without having to fumble with a touchscreen or passwords to change the volume of her music or to advance from one song to another. FIGS. 7 and 8 demonstrate well the technical advantages of the control pod 100 over the prior art.

Figure 9:
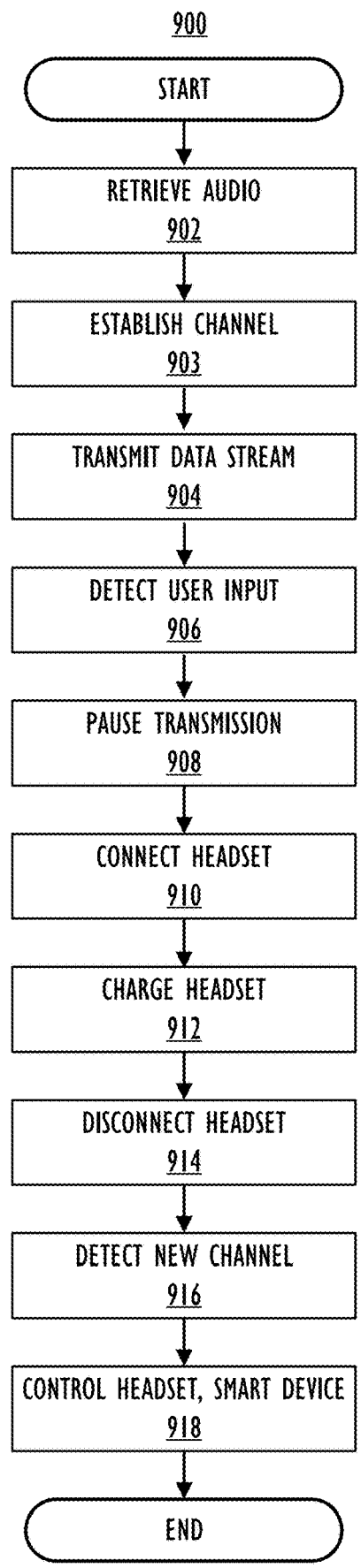
FIG. 9 illustrates a method of operating a headset control pod, in accordance with an example of this disclosure.

FIG. 9 illustrates a method 900 of operating a headset control pod 100, in accordance with an example of this disclosure. The method 900 includes: retrieving 902, using a processor 119, first audio data from a memory 120. The method 900 further includes establishing 903 a first channel between the processor 119 and a wireless headset 206, using a radio 106 of a control pod 100. Thereafter, the method 900 includes transmitting 904 a first data stream over the first channel containing second audio data for broadcast by a speaker 214 of the wireless headset 206, with the second audio data being based on the retrieved audio Thereafter, the method 900 includes detecting 906 a first input using a user interface of the control pod 100 and then pausing 908 transmission of the first data stream, responsive to detecting 906 the first input. The method 900 further includes releasably connecting 910 the wireless headset 206 to the control pod 100 at a wireless headset-receiving area, thereby coupling a power source of the control pod 100 to a battery cell of the wireless headset 206 for charging 912.

In some examples, the method 900 also includes detecting 914 when the wireless headset 206 is decoupled from the power source and detecting 916 when the wireless headset and smart device establish a mutual channel, and controlling 918 functions of both the headset 206 and the smart device 202 in a concerted manner as described in various examples above.

The various examples within this disclosure are provided by way of illustration and should not be construed to limit the scope of the disclosure. Various modifications and changes can be made to the principles and examples described herein without departing from the scope of the disclosure and without departing from the claims which follow.

It is claimed:

1. A wireless headset control pod, comprising:
    a housing;
    a power source;
    a first radio;
    a user interface;
    a wireless headset-receiving area comprising a pin;
    a memory; and
    a processor coupled to the power source, the first radio, the user interface, the pin, and the memory, wherein the processor is operable to:
        communicate with a wireless headset over a first channel using the first radio;
        transmit a first data stream over the first channel containing first audio data for broadcast by a speaker of the wireless headset, the first audio data based on data stored by the memory;
        detect a first input at the user interface and pause transmission of the first data stream, responsive to detecting the first input;
        receive second audio data over the first channel and pause transmission of the first data stream, responsive to receiving the second audio data, the second audio data captured using a microphone of the wireless headset;
        detect a second input at the user interface and reinitiate transmission over the first channel, responsive to detecting the second input;
        detect a coupling of the wireless headset to the power source through the pin; and
        terminate the first channel responsive to the coupling,
    wherein the housing is operable to releasably retain the wireless headset in the wireless headset-receiving area for charging by the power source through the pin.

2. The wireless headset control pod of claim 1, wherein the housing houses a display coupled to the processor, and wherein the processor is further operable to:
    render information using the display, wherein the information corresponds to a charging status of a battery cell of the wireless headset.

3. The wireless headset control pod of claim 1, wherein the housing houses a display coupled to the processor, and wherein the processor is further operable to:
  render information using the display, wherein the information corresponds to the first audio data.

4. The wireless headset control pod of claim 3, wherein the information further corresponds to a playback status of the first audio data.

5. A wireless headset control pod, comprising:
  a housing;
  a power source;
  a first radio;
  a user interface;
  a wireless headset-receiving area comprising a pin;
  a memory; and
  a processor coupled to the power source, the first radio, the user interface, the pin, and the memory, wherein the processor is operable to:
    communicate with a wireless headset over a first channel using the first radio;
    transmit a first data stream over the first channel containing first audio data for broadcast by a speaker of the wireless headset, the first audio data based on data stored by the memory;
    detect a first input at the user interface;
    pause transmission of the first data stream, responsive to detecting the first input detect a coupling of the wireless headset to the power source through the pin; and
    terminate the first channel responsive to the coupling,
    detect a decoupling of the wireless headset from the power source at the pin;
    detect a coupling of the wireless headset with a smart device;
    detect a second input at the user interface; and
    initiate, using the first radio, a second channel between the wireless headset and the smart device, responsive to detecting the second input at the user interface,
  wherein the housing is operable to releasably retain the wireless headset in the wireless headset-receiving area for charging by the power source through the pin.

6. The wireless headset control pod of claim 5, wherein the housing houses a display coupled to the processor, and wherein the processor is further operable to:
  render first information using the display, wherein the first information corresponds to second audio data of the second channel, the second audio data of the second channel comprising second audio data transmitted to the wireless headset by a second radio of the smart device.

7. The wireless headset control pod of claim 6, wherein the processor is further operable to cause the second radio of the smart device to end transmission of the second audio data to the wireless headset, responsive to detection of a third input at the user interface.

8. The wireless headset control pod of claim 5, wherein the processor is further operable to initiate audio pickup by a microphone of the wireless headset for transmission to the smart device over the second channel, responsive to detection of a third input at the user interface or detection of a first voice command captured using the microphone.

9. The wireless headset control pod of claim 8, wherein the processor is further operable to pause audio pickup by the microphone of the wireless headset for transmission to the smart device over the second channel, responsive to detection of a fourth input at the user interface or detection of a second voice command captured using the microphone.

10. The wireless headset control pod of claim 5, wherein the processor is further operable to control one or more telephonic operations of the smart device by transmitting control instructions to a second radio of the smart device, responsive to detecting one or more third inputs at the user interface.

11. The wireless headset control pod of claim 10, wherein the housing houses a display coupled to the processor, and wherein the processor is further operable to:
  render telephonic information associated with the smart device using the display.

12. A method of operating a wireless headset control pod, comprising:
  retrieving, using a processor, first audio data from a memory;
  establishing a first channel between the processor and a wireless headset, using a first radio of a control pod;
  transmitting a first data stream over the first channel containing second audio data for broadcast by a speaker of the wireless headset, the second audio data based on the first audio data;
  detecting a first input using a user interface of the control pod;
  pausing transmission of the first data stream, responsive to detecting the first input;
  releasably connecting the wireless headset to the control pod at a wireless headset-receiving area, the wireless headset-receiving area including a pin;
  coupling a power source of the control pod to a battery cell of the wireless headset using the pin;
  terminating the first channel responsive to the coupling;
  charging the battery cell of the wireless headset using the power source
  detecting a decoupling of the wireless headset from the power source at the pin;
  detecting a coupling of the wireless headset with a smart device;
  detecting a second input at the user interface; and
  initiating, using the first radio, a second channel between the wireless headset and the smart device, responsive to detecting the second input at the user interface.

13. The method of claim 12, wherein the control pod houses a display coupled to the processor, and wherein the method further comprises:
  rendering first information using the display, wherein the first information corresponds to third audio data of the second channel, the third audio data of the second channel comprising third audio data transmitted to the wireless headset by a second radio of the smart device.

14. The method of claim 13, further comprising causing the second radio of the smart device to end transmission of the third audio data to the wireless headset, responsive to detection of a third input at the user interface.

15. The method of claim 12, further comprising initiating audio pickup by a microphone of the wireless headset for transmission to the smart device over the second channel, responsive to detection of a third input at the user interface or detection of a first voice command captured using the microphone.

16. The method of claim 15, further comprising pausing audio pickup by the microphone of the wireless headset for transmission to the smart device over the second channel, responsive to detection of a fourth input at the user interface or detection of a second voice command using the microphone.

17. The method of claim 12, further comprising:
controlling one or more telephonic operations of the smart device by transmitting control instructions to a second radio of the smart device, responsive to detecting one or more third inputs at the user interface.

18. The method of claim 17, wherein the control pod houses a display coupled to the processor, and wherein the method further comprises:
rendering telephonic information associated with the smart device using the display.

\* \* \* \* \*

UNITED STATES PATENT AND TRADEMARK OFFICE
CERTIFICATE OF CORRECTION

| | |
|---|---|
| PATENT NO. | : 11,281,424 B2 |
| APPLICATION NO. | : 16/987222 |
| DATED | : March 22, 2022 |
| INVENTOR(S) | : Arun Rajasekaran |

It is certified that error appears in the above-identified patent and that said Letters Patent is hereby corrected as shown below:

In the Claims

Claim 5, Column 7, Line 27, "to detecting the first input detect a coupling of the" should read -- to detecting the first input; detect a coupling of the --

Claim 5, Column 7, Line 29, "and" should not be present

Claim 5, Column 7, Line 30, "terminate the first channel responsive to the couplilng," should read -- terminate the first channel responsive to the coupling; --

Claim 12, Column 8, Line 34, "power source" should read -- power source; --

Signed and Sealed this
Fourteenth Day of June, 2022

Katherine Kelly Vidal
*Director of the United States Patent and Trademark Office*